United States Patent
Abrahams

(10) Patent No.: US 7,778,188 B2
(45) Date of Patent: Aug. 17, 2010

(54) NETWORK DIAGNOSTIC SYSTEMS AND METHODS FOR TRANSMITTING AND RECEIVING NETWORK MESSAGES

(76) Inventor: Paul C. Abrahams, 3400 Stevenson Blvd., Apt. W31, Fremont, CA (US) 94538

( * ) Notice: Subject to any disclaimer, the term of this patent is extended or adjusted under 35 U.S.C. 154(b) by 662 days.

(21) Appl. No.: 11/627,841

(22) Filed: Jan. 26, 2007

(65) Prior Publication Data
US 2007/0189171 A1    Aug. 16, 2007

Related U.S. Application Data

(60) Provisional application No. 60/773,700, filed on Feb. 15, 2006.

(51) Int. Cl.
*G01R 31/08* (2006.01)
(52) U.S. Cl. .................. 370/244; 370/251; 714/715
(58) Field of Classification Search .................. 370/242, 370/244, 245, 247, 248, 249, 250, 251; 702/125, 702/79, 69, 189; 340/527; 714/715; 719/326
See application file for complete search history.

(56) References Cited

U.S. PATENT DOCUMENTS

| | | | |
|---|---|---|---|
| RE37,613 E | * | 3/2002 | Savage .......................... 710/9 |
| 6,915,464 B1 | * | 7/2005 | Castagnozzi et al. ........ 714/709 |
| 7,269,674 B2 | * | 9/2007 | Chikusa et al. ............... 710/74 |

OTHER PUBLICATIONS

Vitesse Semiconductor Corporation, Enhanced 2:1 Port Selector and 1:2 Port Multiplier for Serial ATA and Serial Attached SCSI, VSC7173 Data Sheet, Jun. 29, 2004, 18 pages, VMDS-10121 Revision 4.0 (PDF enclosed entitled Document 1, 18 pages.).
Vitesse Semiconductor Corporation, Enhanced 2:1 Port Selector for Serial ATA and Serial Attached SCSI, VSC7177 Data Sheet, Jul. 29, 2004, 24 pages, VMDS-10097 Revision 4.2 (PDF enclosed entitled Document 2, 24 pages.).

* cited by examiner

*Primary Examiner*—Ian N Moore

(57) ABSTRACT

A networking system is provided. The networking system may include a network diagnostic component. The network diagnostic component may perform any of a variety of network diagnostic functions. The network diagnostic component may include a diagnostic module. The network diagnostic component may also include at least one transceiver. The transceiver may receive a signal from a first node. The signal may form one or more network messages, for example. The transceiver may send the signal to a second node. The transceiver may send the signal to the diagnostic module, which may alter the signal. For example, the diagnostic module may digitally retime the signal, may alter the content of the messages themselves, and/or may alter the signal in other suitable ways. The transceiver may send the altered signal to the second node.

20 Claims, 14 Drawing Sheets

NETWORK DIAGNOSTIC SYSTEMS AND METHODS FOR TRANSMITTING AND RECEIVING NETWORK MESSAGES

CROSS-REFERENCE TO RELATED APPLICATIONS

This application claims the benefit of U.S. Provisional Application No. 60/773,700, filed Feb. 15, 2006, which is incorporated herein by reference in its entirety.

BACKGROUND

1. Field of the Invention

The present invention relates generally to networking systems. More particularly, embodiments of the invention relate generally to transmitting and receiving network messages.

2. Background Technology

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Two common network protocols are Serial Attached SCSI (SAS) protocol and Serial Advanced Technology Attachment (SATA) protocol. SAS-compatible devices are typically compatible with SATA devices. As shown in FIG. 1, one conventional system 100 includes nodes 102a, 102b, 104. The nodes 102a, 102b, 104 are SAS or SATA devices. The nodes 102a, 102b provide redundant access to the node 104—that is, either of the nodes 102a, 102b may be used to communicate with the node 104. As shown in FIG. 1, the nodes 102a, 102b communicate with the node 104 via a SAS/SATA transceiver 106.

FIG. 2 illustrates aspects of the SAS/SATA transceiver 106. As shown in FIG. 2, the SAS/SATA transceiver 106 includes a first bidirectional port 108 coupled to the node 102a, a second bidirectional port 110 coupled to the node 102b, and a third bidirectional port 112 coupled to the node 104. The SAS/SATA transceiver 106 also includes multiplexers 126, 128, 130. The multiplexer 130 provides a selectable output, which is selected from the inputs that it receives (the input signal of the port 108 and the input signal of the port 110). The multiplexer 126 provides a selectable output, which is selected from the inputs that it receives (the input signal from the port 108 and the input signal from the port 112). The multiplexer 128 provides a selectable output, which is selected from the inputs that it receives (the input signal from the port 110 and the input signal from the port 112). The SAS/SATA transceiver 106 also includes a control module (not shown) that may be used to control the outputs of the multiplexers 126, 128, 130. These aspects of the SAS/SATA transceiver 106 may be implemented using a VSC7177, which is a commercially available product of Vitesse Semiconductor Corporation, having offices at 741 Calle Plano, Camarillo, Calif. 93012, USA.

The SAS/SATA transceiver 106 helps nodes 102a, 102b communicate with the node 104. In particular, the control module of the SAS/SATA transceiver 106 may be used to control the outputs of the multiplexers 126, 128, 130 to allow the nodes 102a, 102b to communicate with the node 104.

To allow the nodes 102a, 104 to communicate, the control module of the SAS/SATA transceiver 106 causes the multiplexer 130 to select the input signal of the port 108. With the multiplexer 130 selecting the input signal of the port 108, the input of the port 108 is sent as the output of the port 112, which allows the node 102a to send network messages to the node 104. To allow the nodes 102a, 104 to communicate, the control module of the SAS/SATA transceiver 106 also causes the multiplexer 126 to select the input signal of the port 112. With the multiplexer 126 selecting the input signal of the port 112, the input of the port 112 is sent as the output of the port 108, which allows the node 104 to send network messages to the node 102a.

To allow the nodes 102b, 104 to communicate, the control module of the SAS/SATA transceiver 106 causes the multiplexer 130 to select the input signal of the port 110. With the multiplexer 130 selecting the input signal of the port 110, the input of the port 110 is sent as the output of the port 112, which allows the node 102b to send network messages to the node 104. To allow the nodes 102b, 104 to communicate, the control module of the SAS/SATA transceiver 106 also causes the multiplexer 128 to select the input signal of the port 112. With the multiplexer 128 selecting the input signal of the port 112, the input of the port 112 is sent as the output of the port 110, which allows the node 104 to send network messages to the node 102b.

The port 108 has a loop-back mode to permit the node 102a to test its communication with the SAS/SATA transceiver 106. In particular, the control module of the SAS/SATA transceiver 106 may cause the multiplexer 126 to select the input signal from the port 108—causing any messages sent from the node 102a to "loop back" or return to the node 102a. When the port 108 is in this loop-back mode, the node 102a may send test messages to the SAS/SATA transceiver 106, which returns the test messages back to the node 102a via the output of the port 108.

The loop-back mode of the port 108 is typically used when the SAS/SATA transceiver 106 is not sending messages from the node 102a to the node 104. For example, when the multiplexer 130 is selecting the input signal from the port 110 (e.g., when the SAS/SATA transceiver 106 is sending messages from the node 102b to the node 104), the multiplexer 130 is not selecting the signal from the port 108, and thus, the SAS/SATA transceiver 106 is not sending messages from the node 102a to the node 104. Since the SAS/SATA transceiver 106 is not sending messages from the node 102a to the node 104, the node 102a may advantageously send test messages to the port 108 in loop-back mode to test its communication with the SAS/SATA transceiver 106.

The port 110 also has a loop-back mode to permit the node 102a to test its communication with the SAS/SATA transceiver 106. In particular, the control module of the SAS/SATA transceiver 106 may cause the multiplexer 128 to select the input signal from the port 110—causing any messages sent from the node 102b to "loop back" or return to the node 102b. When the port 110 is in this loop-back mode, the node 102b may send test messages to the SAS/SATA transceiver 106, which returns the test messages back to the node 102b via the output of the port 110.

The loop-back mode of the port 110 is typically used when the SAS/SATA transceiver 106 is not sending messages from the node 102b to the node 104. For example, when the multiplexer 130 is selecting the input signal from the port 108 (e.g., when the SAS/SATA transceiver 106 is sending messages from the node 102a to the node 104), the multiplexer 130 is not selecting the signal from the port 110, and thus, the SAS/SATA transceiver 106 is not sending messages from the node 102b to the node 104. Since the SAS/SATA transceiver 106 is not sending messages from the node 102b to the node 104, the node 102b may advantageously send test messages to the port 110 in loop-back mode to test its communication with the SAS/SATA transceiver 106.

While these loop-back modes may allow nodes to test certain types of connections, many other types of testing may be needed in SAS or SATA networks. Accordingly, various SAS/SATA network diagnostic components have been created to test SAS networks, SATA networks or both.

For example, as shown in FIG. 3, a networking system 132 includes nodes 134, 136, which are SAS/SATA nodes that communicate with each other via the networking system. The networking system 132 also includes a known SAS/SATA network diagnostic component 138. The SAS/SATA network diagnostic component 138 may receive and analyze one or more network messages sent between the nodes 134, 136. The SAS/SATA network diagnostic component 138 may also retransmit those network messages. In particular, the SAS/SATA network diagnostic component 138 may receive network messages sent from the node 134 and then retransmit them to the node 136. Also, the SAS/SATA network diagnostic component 138 may receive network messages sent from the node 136 and then retransmit them to the node 134.

Prior to retransmitting these network messages, the SAS/SATA network diagnostic component 138 can alter the signal used to transmit the network messages. For example, the SAS/SATA network diagnostic component 138 may digitally retime the signal, may alter the content of the messages themselves, or both. Because it is not always desirable to have the SAS/SATA network diagnostic component 138 alter the signal, the SAS/SATA network diagnostic component 138 may be selectively configured to alter (or not to alter) the signal used to transmit the network messages.

FIG. 4 illustrates aspects of the architecture that the SAS/SATA diagnostic component 138 uses to help the SAS/SATA diagnostic component 138 to be selectively configured to alter (or not to alter) the signal used to transmit the network messages between the nodes 134, 136.

As shown in FIG. 4, the SAS/SATA diagnostic component 138 includes a diagnostic module 140, which includes a signal alteration module 142. The SAS/SATA diagnostic component 138 also includes SAS/SATA transceivers 144a, 144b.

The SAS/SATA transceivers 144a, 144b include various aspects. The SAS/SATA transceivers 144a, 144b respectively include a first bidirectional port 146a, 146b; a second bidirectional port 148a, 148b; and a third bidirectional port 150a, 150b. These bidirectional ports include an input and an output. The SAS/SATA transceivers 144a, 144b respectively include multiplexers 152a, 152b. The multiplexer 152a provides a selectable output, which is selected from the inputs that it receives (the input signal from the port 148a and the input signal from the port 150a). The multiplexer 152b also provides a selectable output, which is selected from the inputs that it receives (the input signal from the port 148b and the input signal from the port 150b). The input of the port 146a is transmitted to the outputs of the ports 148a, 150a; and the input of the port 146b is transmitted to the outputs of the ports 148b, 150b. The SAS/SATA transceivers 144a, 144b may each include a control module (not shown) that may be used to control the outputs of the multiplexers 152a, 152b. These aspects of the SAS/SATA transceivers 144a, 144b may be implemented using a VSC7173, which is a commercially available product of Vitesse Semiconductor Corporation, having offices at 741 Calle Plano, Camarillo, Calif. 93012, USA.

As shown in FIG. 4, the ports 148a, 148b are coupled to the diagnostic module 140. The ports 150a, 150b are coupled to each other. The port 146a is coupled to the node 134, and the port 146b is coupled to the node 136. As discussed in further detail below, the control modules of the SAS/SATA transceivers 144a, 144b may be used to control the outputs of the multiplexers 152a, 152b to help the SAS/SATA diagnostic component 138 to be selectively configured to alter (or not to alter) the signal used to transmit the network messages between the nodes 134, 136.

FIG. 5 illustrates an exemplary path of the signal used to transmit network messages from the node 134 to the node 136 without the signal alteration module 142 altering the signal. As shown in FIG. 5, the signal is received via the input of the port 146a and transmitted to the output of the port 150a. The input of the port 150b receives the signal from the output of the port 150a. The signal is sent from the input of the port 150b to the output of the port 146b via the multiplexer 152b (FIG. 4). Thus, the signal used to transmit network messages from the node 134 to the node 136 is sent from the port 146a to the port 150a, from the port 150a to the port 150b, and from the port 150b to the port 146b without the signal alteration module 142 altering the signal. As shown in FIG. 5, the signal is also transmitted from the input of the port 146a to the output of the port 148a. The diagnostic module 140 receives the signal from the output of the port 148a and may perform a desired network diagnostic function using the network messages sent via the signal.

FIG. 6 illustrates an exemplary path of the signal used to transmit network messages from the node 136 to the node 134 without the signal alteration module 142 altering the signal. As shown in FIG. 6, the signal is received via the input of the port 146b and transmitted to the output of the port 150b. The input of the port 150a receives the signal from the output of the port 150b. The signal is sent from the input of the port 150a to the output of the port 146a via the multiplexer 152a (FIG. 4). Thus, the signal used to transmit network messages from the node 136 to the node 134 is sent from the port 146b to the port 150b, from the port 150b to the port 150a, and from the port 150a to the port 146a without the signal alteration module 142 altering the signal. As shown in FIG. 6, the signal is also transmitted from the input of the port 146b to the output of the port 148b. The diagnostic module 140 receives the signal from the output of the port 148b and may perform a desired network diagnostic function using the network messages sent via the signal.

FIG. 7 illustrates an exemplary path of the signal used to transmit network messages from the node 134 to the node 136 with the signal alteration module 142 altering the signal. As shown in FIG. 7, the signal is received via the input of the port 146a and transmitted to the output of the port 148a. The diagnostic module 140 receives the signal from the output of the port 148a and may perform a desired network diagnostic function using the network messages sent via the signal. In addition, the signal alteration module 142 may alter the signal. For example, the signal alteration module 142 may digitally retime the signal, may alter the content of the network messages themselves, or both. The diagnostic module 140 transmits the altered signal to the input of the port 148b. The altered signal is sent from the input of the port 148b to the output of the port 146b via the multiplexer 152b (FIG. 4).

FIG. 8 illustrates an exemplary path of the signal used to transmit network messages from the node 136 to the node 134 with the signal alteration module 142 altering the signal. As shown in FIG. 8, the signal is received via the input of the port 146b and transmitted to the output of the port 148b. The diagnostic module 140 receives the signal from the output of the port 148b and may perform a desired network diagnostic function using the network messages sent via the signal. In addition, the signal alteration module 142 may alter the signal. For example, the signal alteration module 142 may digitally retime the signal, may alter the content of the network messages themselves, or both. The diagnostic module 140 transmits the altered signal to the input of the port 148a. The altered signal is sent from the input of the port 148a to the output of the port 146a via the multiplexer 152a (FIG. 4).

Advantageously, because it is sometimes desirable to have the SAS/SATA network diagnostic component 138 alter a signal used to transmit network messages between nodes, the SAS/SATA network diagnostic component 106 may be selectively configured to have the alteration module 142 alter the signal (as shown in FIGS. 7-8). In addition, because it is sometimes not desirable to have the SAS/SATA network diagnostic component 138 alter the signal, the SAS/SATA network diagnostic component 106 may be selectively configured to have the alteration module 142 not alter the signal (as shown in FIGS. 5-6).

Unfortunately, as shown in FIGS. 5-8, the signal (whether altered by the signal alteration module 142 or not) passes through each of the SAS/SATA transceivers 144a, 144b—which can subject the signal to increased jitter and signal degradation.

SUMMARY

A need therefore exists for systems and methods that reduce the above-described disadvantages and problems and/or other disadvantages and problems.

One aspect is a network diagnostic component that may comprise a network diagnostic module and a first transceiver. The first transceiver may comprise a first port including an input, a second port including an output, and a third port including an input and an output. The network diagnostic module may be configured to perform at least one network diagnostic function. The first transceiver may be configurable between a first state and a second state. When the first transceiver is in the first state, the input of the first port may be configured for receiving a first signal from a first node, the first signal forming one or more network messages; the output of the second port may be configured for sending the first signal to the network diagnostic module; the input of the third port may be configured for receiving a second signal from the network diagnostic module, the second signal forming one or more network messages; and the output of the third port may be configured for sending the second signal to a second node. When the first transceiver is in the second state, the input of the first port may be configured for receiving a third signal from the first node, the third signal forming one or more network messages; the output of is the second port may be configured for sending the third signal to the network diagnostic module; and the output of the third port may be configured for sending the third signal to the second node.

Another aspect is a network diagnostic component that may comprise a signal alteration module and a first transceiver. The first transceiver may comprise a first port including an input, a second port including an output, and a third port including an input and an output. The first transceiver may be configurable between a first state and a second state. When the first transceiver is in the first state, the input of the first port may be configured for receiving a first signal from a first node, the first signal forming one or more network messages; the output of the second port may be configured for sending the first signal to the signal alteration module; the input of the third port may be configured for receiving a second signal from the signal alteration module, the second signal forming one or more network messages; and the output of the third port may be configured for sending the second signal to a second node. When the first transceiver is in the second state, the input of the first port may be configured for receiving a third signal from the first node, the third signal forming one or more network messages; the output of the second port may be configured for sending the third signal to the network diagnostic module; and the output of the third port may be configured for sending the third signal to the second node.

Yet another aspect is a network diagnostic component that may comprise a network diagnostic module and a first transceiver. The first transceiver may comprise a first port including an input, a second port including an output, and a third port including an input and an output. The network diagnostic module may be configured to perform at least one network diagnostic function. The first transceiver may be configurable between a first state and a second state. When the first transceiver is in the first state, the input of the first port may be configured for receiving a first set of one or more network messages from a first node; the output of the second port may be configured for sending the first set of one or more network messages to the network diagnostic module; the input of the third port may be configured for receiving a second set of one or more network messages from the network diagnostic module, the second set of one or more network messages being derived from the first set of one or more network messages; and the output of the third port may be configured for sending the second set of one or more network messages to a second node. When the first transceiver is in the second state, the input of the first port may be configured for receiving a third set of set of one or more network messages from the first node; the output of the second port may be configured for sending the third set of set of one or more network messages to the network diagnostic module; and the output of the third port may be configured for sending the third set of set of one or more network messages to the second node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described. Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

To further clarify the above and other advantages and features of embodiments of the present invention, a more particular description of invention will be rendered by reference to specific embodiments thereof which are illustrated in the appended drawings. It is appreciated that these drawings depict only typical embodiments of the invention and are therefore not to be considered limiting of its scope. Embodiments of the invention will be described and explained with additional specificity and detail through the use of the accompanying drawings in which.

DETAILED DESCRIPTION

Certain embodiments relate generally to networking systems, including the testing of high speed data transmission systems and components. Embodiments of the invention may be used in other contexts unrelated to testing systems and components and/or unrelated to high speed data transmission.

Exemplary Networking System

Figure 9:
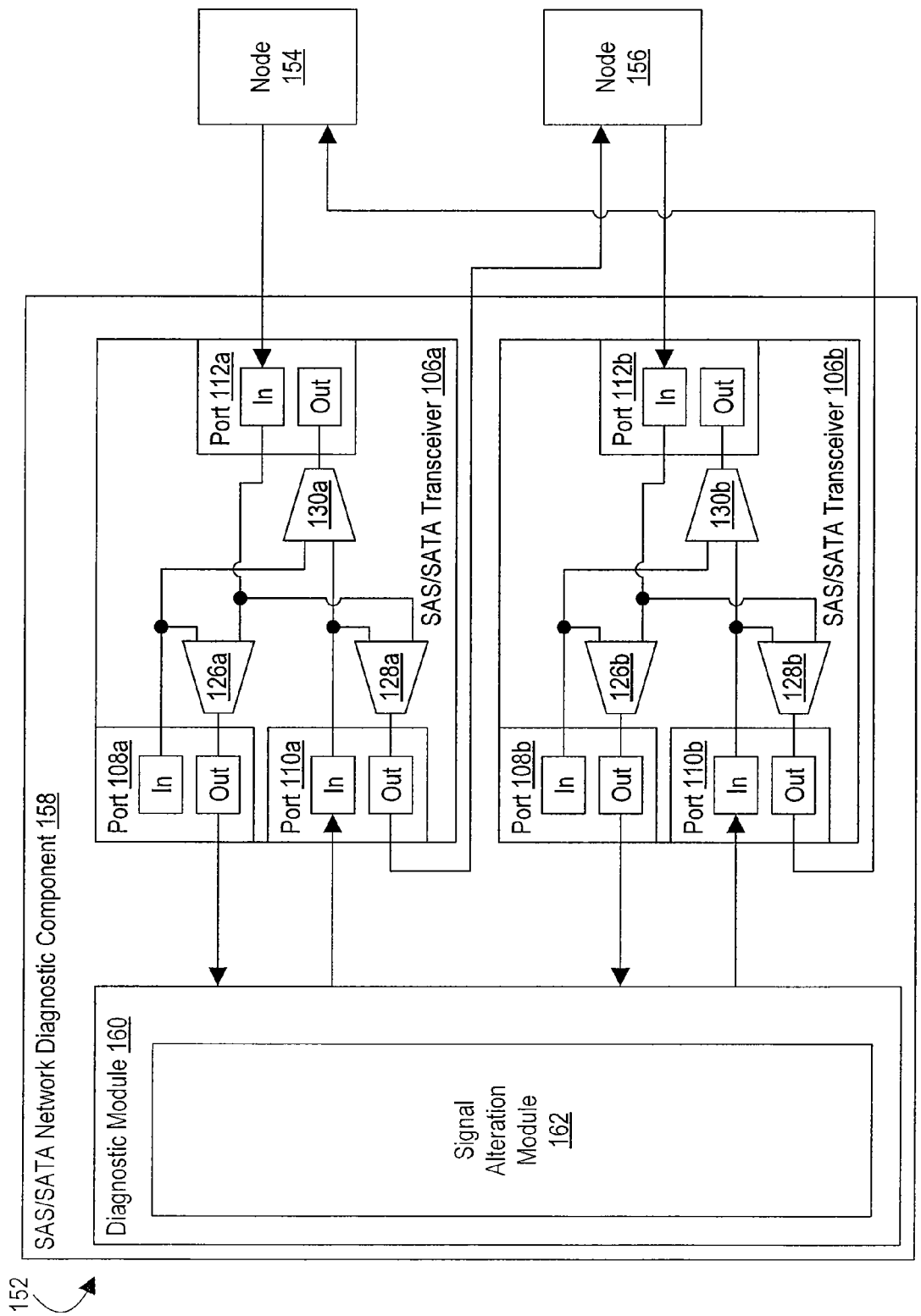
FIG. 9 is a block diagram of a networking system, according to an embodiment of the invention.

FIG. 9 is a block diagram of an exemplary networking system 152. The networking system 152 may include one or more nodes 154, 156, which communicate with each other via the networking system. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like.

As shown in FIG. 9, the nodes 154, 156 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 154, 156 need not be SATA/SATA nodes and that the nodes 154, 156 may be other types of nodes that are compatible with other types of network protocols.

Exemplary Network Diagnostic Component

The networking system 152 may comprise a network, network diagnostic system, a network testing system, or the like including network diagnostic components (such as network diagnostic component 158), which may be configured to communicate network messages among nodes. For example, the network diagnostic component 158 may be inserted between the nodes 154, 156 such that network messages sent between the nodes 154, 156 are available to network diagnostic component 158 and/or are routed through the network diagnostic component 158.

In further detail, the network diagnostic component 158 may send and receive signals or data. Accordingly, using a signal, the network diagnostic component 158 may receive one or more network messages from a node, send one or more network messages to a node, or both. For example, the network diagnostic component 158 may receive one or more network messages sent between the nodes 154, 156. The network diagnostic component 158 may also retransmit those network messages. In particular, the network diagnostic component 158 may receive network messages sent from the node 154 and then retransmit them to the node 156. Also, the network diagnostic component 158 may receive network messages sent from the node 156 and then retransmit them to the node 154.

Prior to retransmitting these network messages, the network diagnostic component 158 can alter the signal used to transmit the network messages. For example, the network diagnostic component 158 may digitally retime the signal, may alter the content of the messages themselves, or both. It will be appreciated that the diagnostic module 160 may alter the signal in other desired ways. Because it is not always desirable to have the network diagnostic component 158 alter the signal, the network diagnostic component 158 may be selectively configured to alter (or not to alter) the signal used to transmit the network messages.

The network diagnostic component 158 may also perform a variety of network diagnostic functions using network messages sent between the nodes 154, 156. In performing some of these diagnostic functions, the network diagnostic component 158 may be configured to be passive to the network messages. If desired, the network diagnostic component 158 may receive at least some of the network messages, and may transmit some or all of the received traffic. In performing other diagnostic functions, the network diagnostic component 158 may be configured to alter some or all of the network traffic.

As shown in FIG. 9, the network diagnostic component 158 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 158 need not be a SAS/SATA network diagnostic component and that the network diagnostic component 158 may be another type of network diagnostic component that is compatible with other types of network protocols. In fact, the network diagnostic component 158 may be configured to perform its functions on any type of network and/or network topology using any number of network protocols.

Exemplary Network Diagnostic Component Architecture

As shown in FIG. 9, the diagnostic component 158 may have an exemplary architecture to help the diagnostic component 158 to be selectively configured to alter (or not to alter) the signal used to transmit the network messages between the nodes 154, 156.

As shown in FIG. 9, the network diagnostic component 158 includes a diagnostic module 160, which may perform one or more network diagnostic functions using the network messages transmitted between the nodes 154, 156. The diagnostic module 160 includes a signal alteration module 162. In one embodiment, the diagnostic module 160 may comprise one or more hardware modules, one or more software modules, or both.

As shown in FIG. 9, the network diagnostic component 158 also includes one or more transceivers 106a, 106b, which are preferably SAS/SATA transceivers. As used herein, "SAS/SATA transceivers" includes transceivers that are SAS compatible, transceivers that are SATA compatible, and transceivers that are both SAS compatible and SATA compatible. It will be appreciated, however, that the transceivers 106a, 106b need not be SAS/SATA transceivers and that the transceivers 106a, 106b may be other types of transceivers that are compatible with other types of network protocols.

Figure 1:
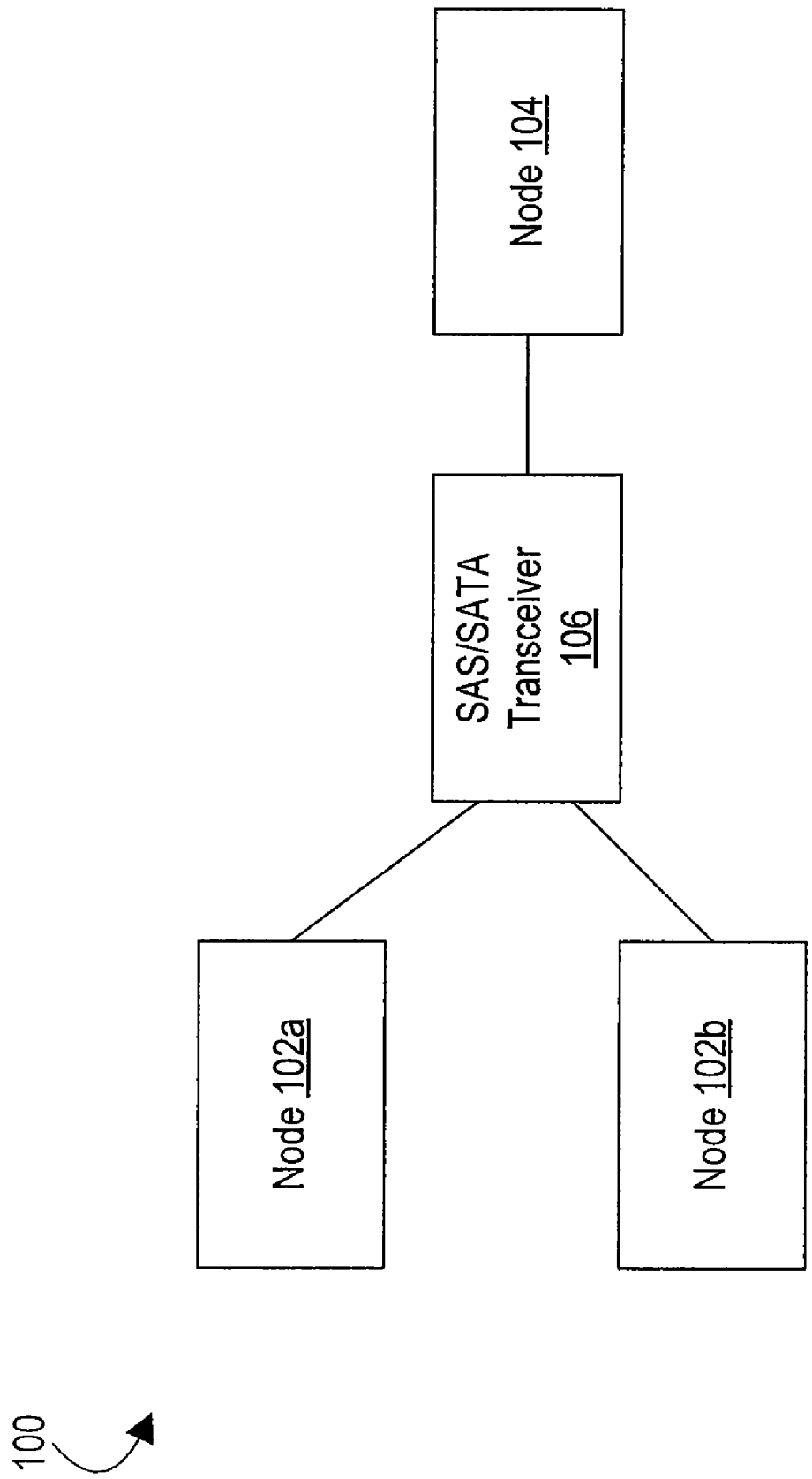
FIG. 1 is a block diagram of a prior art networking system.
Figure 2:
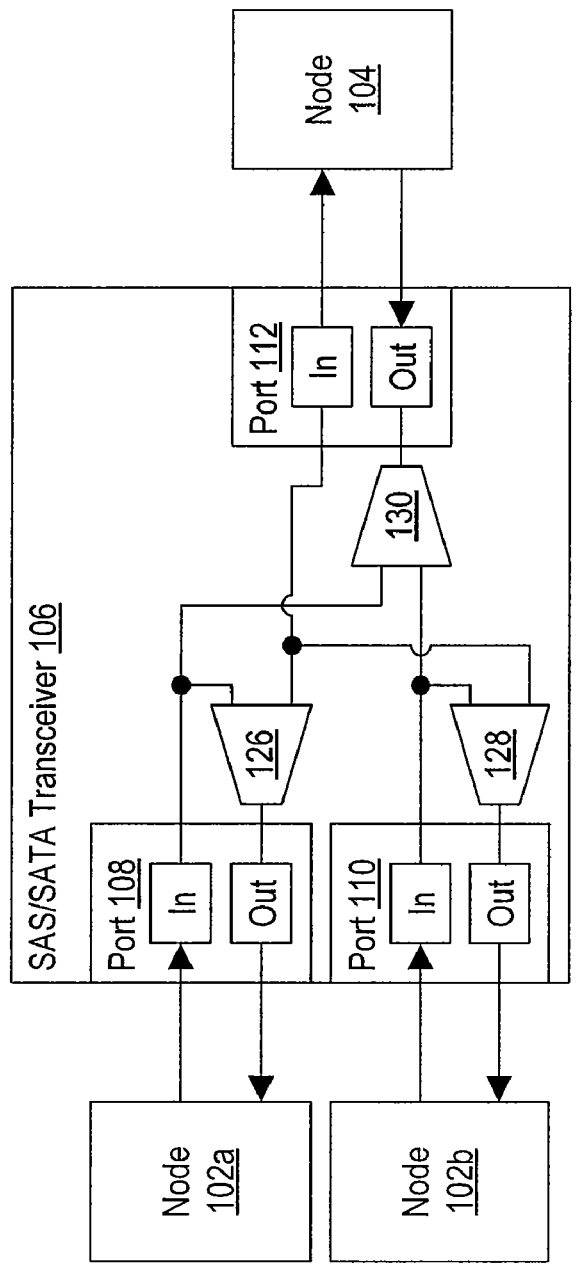
FIG. 2 is a block diagram of the prior art networking system shown in FIG. 1.
Figure 3:
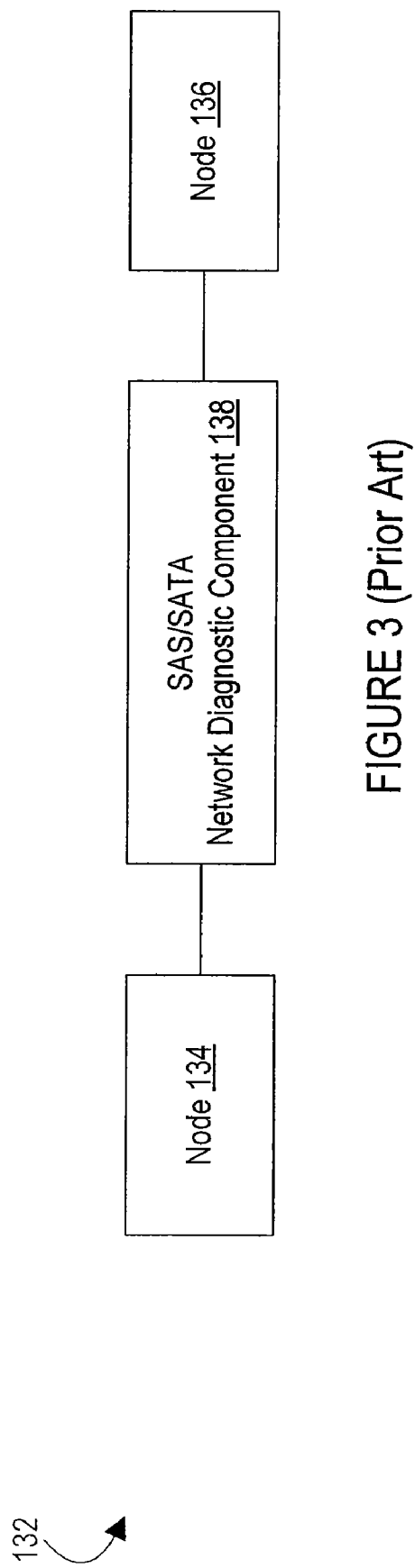
FIG. 3 is a block diagram of another prior art networking system.
Figure 4:
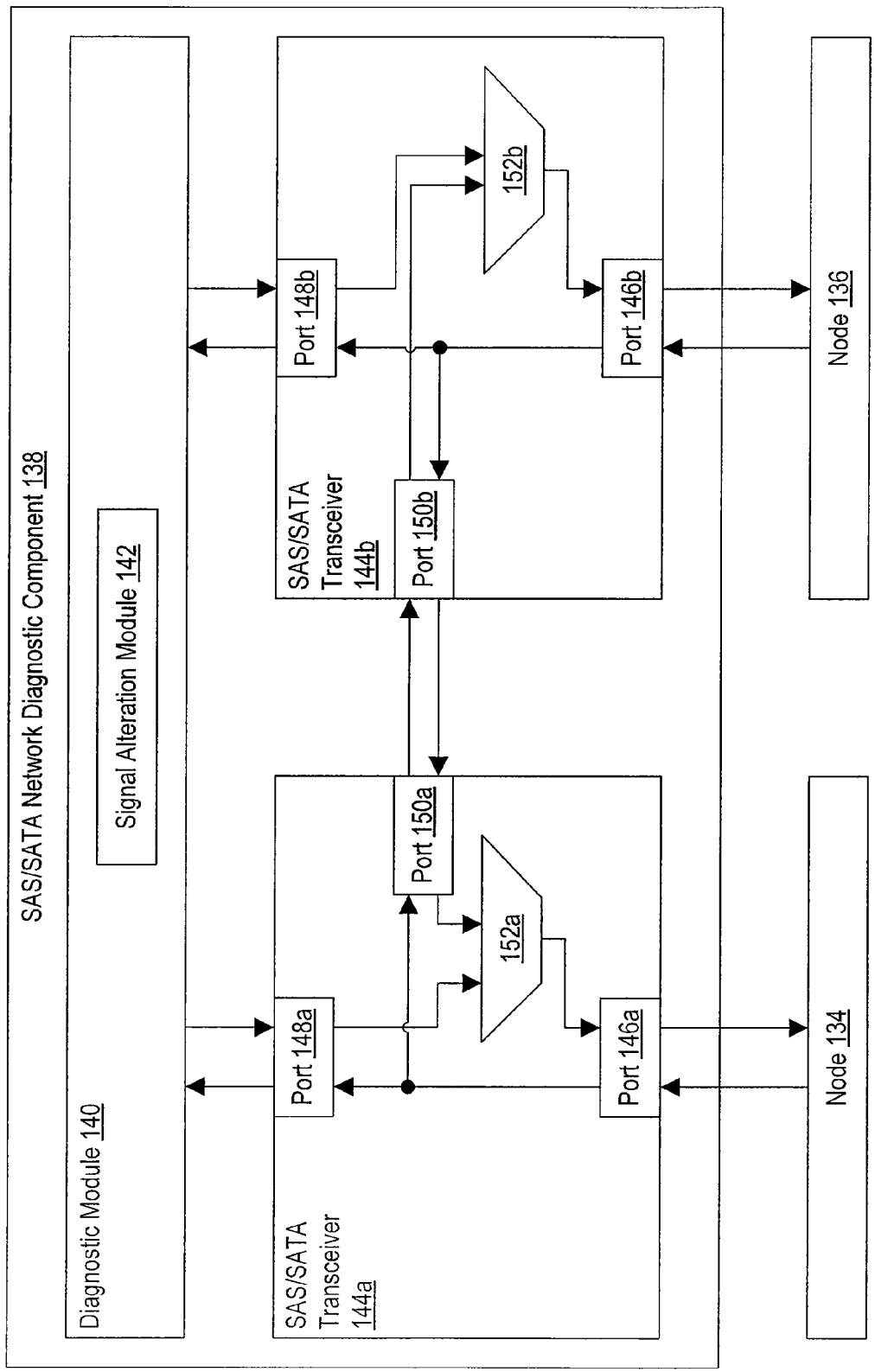
FIG. 4 is a block diagram of the prior art networking system shown in FIG. 3.

The transceivers 106a, 106b may include aspects of the transceiver 106 (FIG. 2) described above. For example, as shown in FIG. 9, transceivers 106a, 106b may respectively include a first bidirectional port 108a, 108b; a second bidirectional port 110a, 110b; and a third bidirectional port 112a, 112b. In addition, the transceivers 106a, 106b may respectively include multiplexers 126a, 126b; 128a, 128b; and 130a, 130b. The multiplexers 130a, 130b may provide a selectable output, which is selected from the inputs that they receive (respectively, the input signal of the port 108a, 108b and the input signal of the port 110a, 110b). The multiplexers 126a, 126b may provide a selectable output, which is selected from the inputs that they receive (respectively, the input signal from the port 108a, 108b and the input signal from the port 112a, 112b). The multiplexers 128a, 128b provide a selectable output, which is selected from the inputs that they receive (respectively, the input signal from the port 110a, 110b and the input signal from the port 112a, 112b). The transceivers 106a, 106b may also include a control module (not shown) that may be used to control the outputs of the multiplexers 126a, 126b; 128a, 128b; and 130a, 130b. As mentioned above, these aspects of the SAS/SATA transceiver 106 may be implemented using a VSC7177, which is a commercially available product of Vitesse Semiconductor Corporation, having offices at 741 Calle Plano, Camarillo, Calif. 93012, USA.

As shown in FIG. 9, the input of the port 112*a* is coupled to the node 154, which allows the network diagnostic component 158 to receive network messages sent from the node 154. The output of the port 110*a* is coupled to the node 156, which allows the network diagnostic component 158 to transmit these received network messages to the node 156. In addition, the output of the port 108*a* and the input of the port 110*a* are coupled to the diagnostic module 160.

As shown in FIG. 9, the input of the port 112*b* is coupled to the node 156, which allows the network diagnostic component 158 to receive network messages sent from the node 156. The output of the port 110*b* is coupled to the node 154, which allows the network diagnostic component 158 to transmit these received network messages to the node 156. In addition, the output of the port 108*b* and the input of the port 110*b* are coupled to the diagnostic module 160.

Some of the aspects of the transceivers 106*a*, 106*b* may be used to provide the ports 110*a*, 110*b* with a loop-back mode like, for example, the port 110 of the transceiver 106 (FIG. 2) described above. In particular, the control modules of transceivers 106*a*, 106*b* may respectively cause the multiplexers 128*a*, 128*b* to select the input signals from the ports 110*a*, 110*b*. As discussed below with reference to FIGS. 10-13, providing the ports 110*a*, 110*b* of the transceivers 106*a*, 106*b* with a loop-back mode may advantageously help the diagnostic component 158 to be selectively configured to alter (or not to alter) the signal used to transmit the network messages between the nodes 154, 156.

Figure 10:
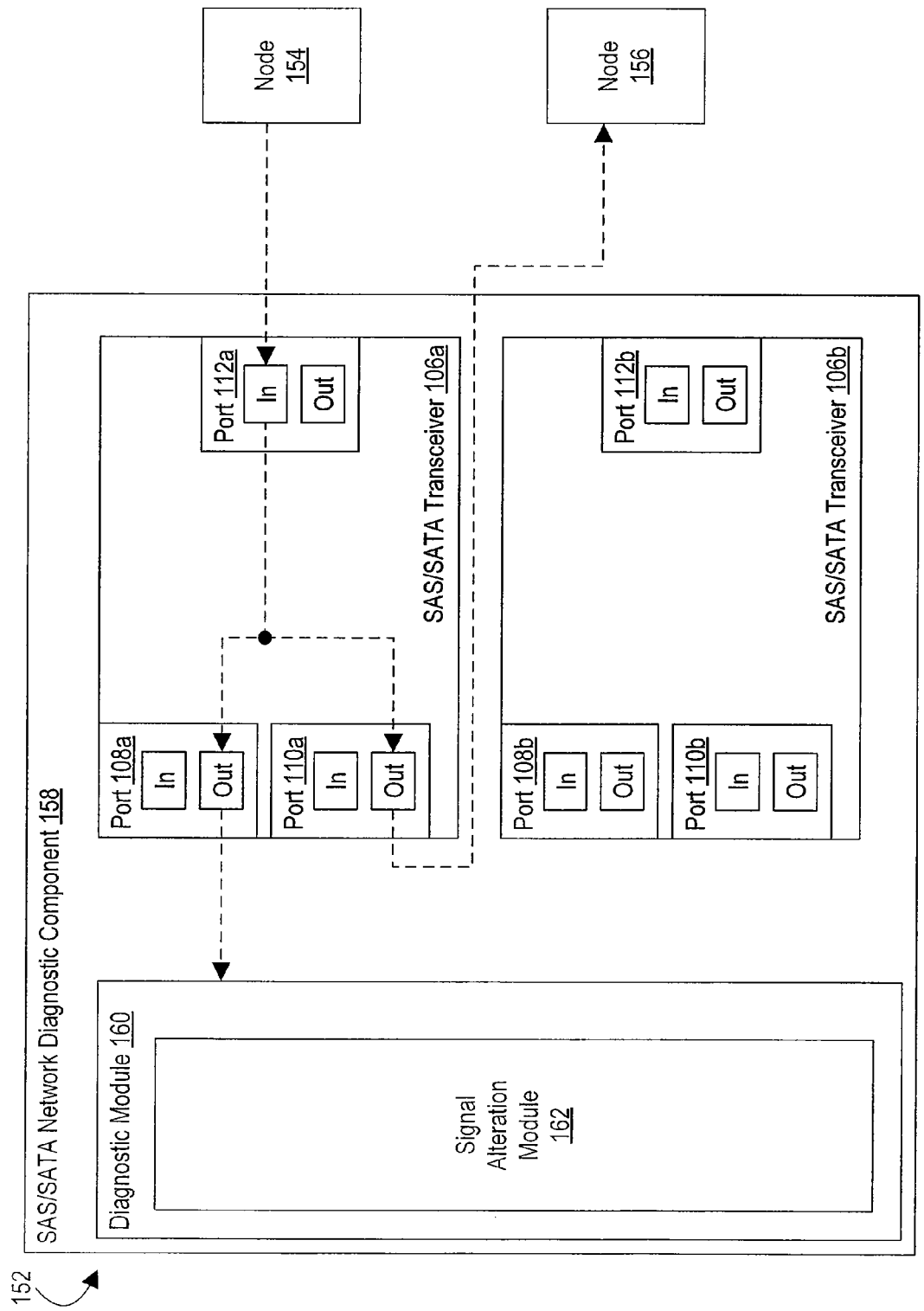
FIG. 10 is a block diagram of the networking system shown in FIG. 9, illustrating an exemplary path of a signal used to transmit network messages from between nodes.

FIG. 10 illustrates an exemplary path of the signal used to transmit network messages from the node 154 to the node 156 without the signal alteration module 162 altering the signal. As shown in FIG. 10, the signal may be received via the input of the port 112*a*. The signal may be sent from input of the port 112*a* to the output of the port 110*a* via the multiplexer 128*a* (FIG. 9). Thus, the signal used to transmit network messages from the node 154 to the node 156 may be sent from the port 112*a* to the port 110*a* without the signal alteration module 142 altering the signal. As shown in FIG. 10, the signal may be also transmitted from the input of the port 112*a* to the output of the port 108*a* via the multiplexer 126*a* (FIG. 9). The diagnostic module 160 may receive the signal from the output of the port 108*a* and may perform a desired network diagnostic function using the network messages sent via the signal.

Figure 11:
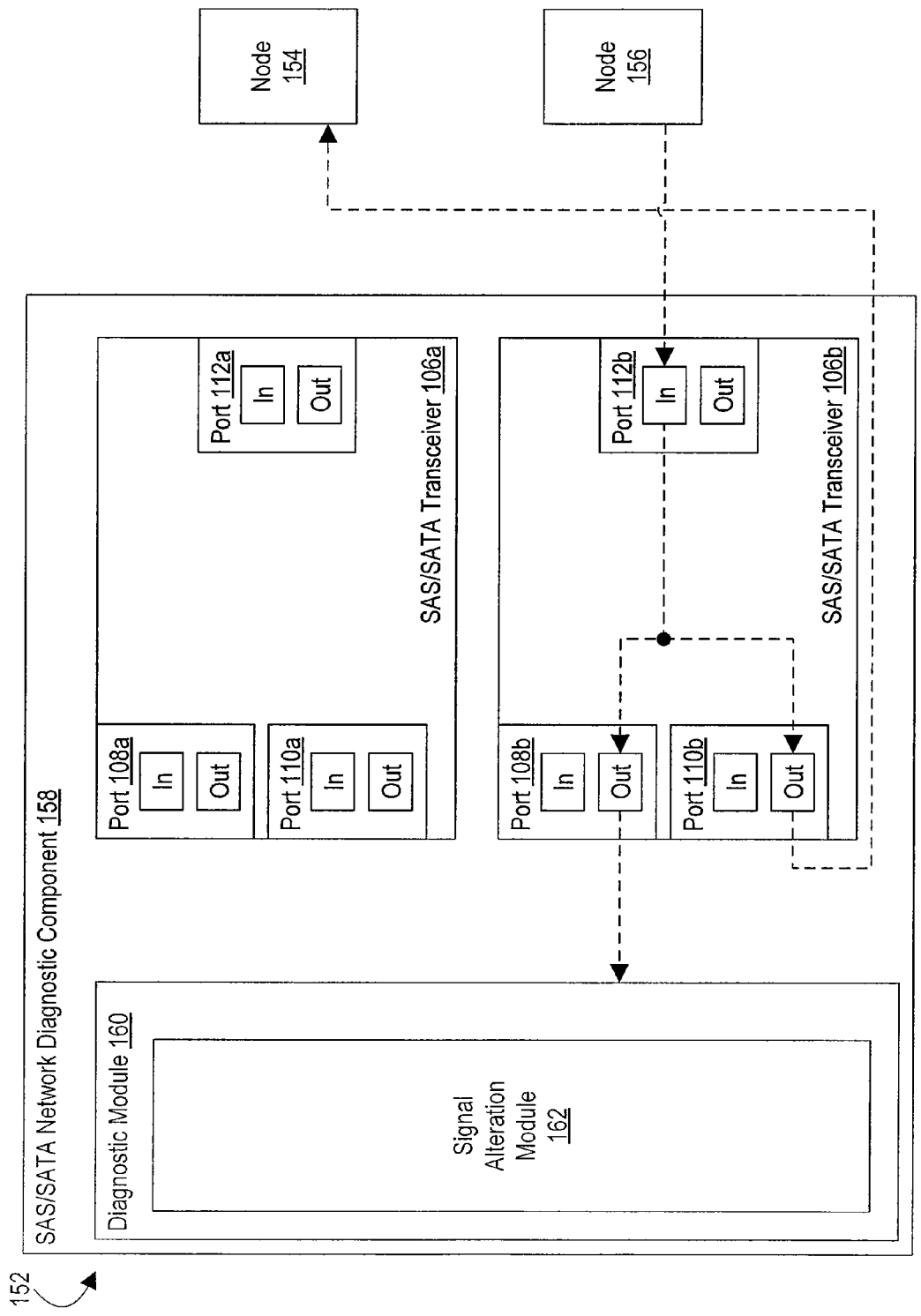
FIG. 11 is a block diagram of the networking system shown in FIG. 9, illustrating another exemplary path of a signal used to transmit network messages from between nodes.

FIG. 11 illustrates an exemplary path of the signal used to transmit network messages from the node 156 to the node 154 without the signal alteration module 162 altering the signal. As shown in FIG. 11, the signal may be received via the input of the port 112*b*. The signal may be sent from input of the port 112*b* to the output of the port 110*b* via the multiplexer 128*b* (FIG. 9). Thus, the signal used to transmit network messages from the node 156 to the node 154 may be sent from the port 112*b* to the port 110*b* without the signal alteration module 142 altering the signal. As shown in FIG. 10, the signal may be also transmitted from the input of the port 112*b* to the output of the port 108*b* via the multiplexer 126*b* (FIG. 9). The diagnostic module 160 may receive the signal from the output of the port 108*b* and may perform a desired network diagnostic function using the network messages sent via the signal.

Figure 12:
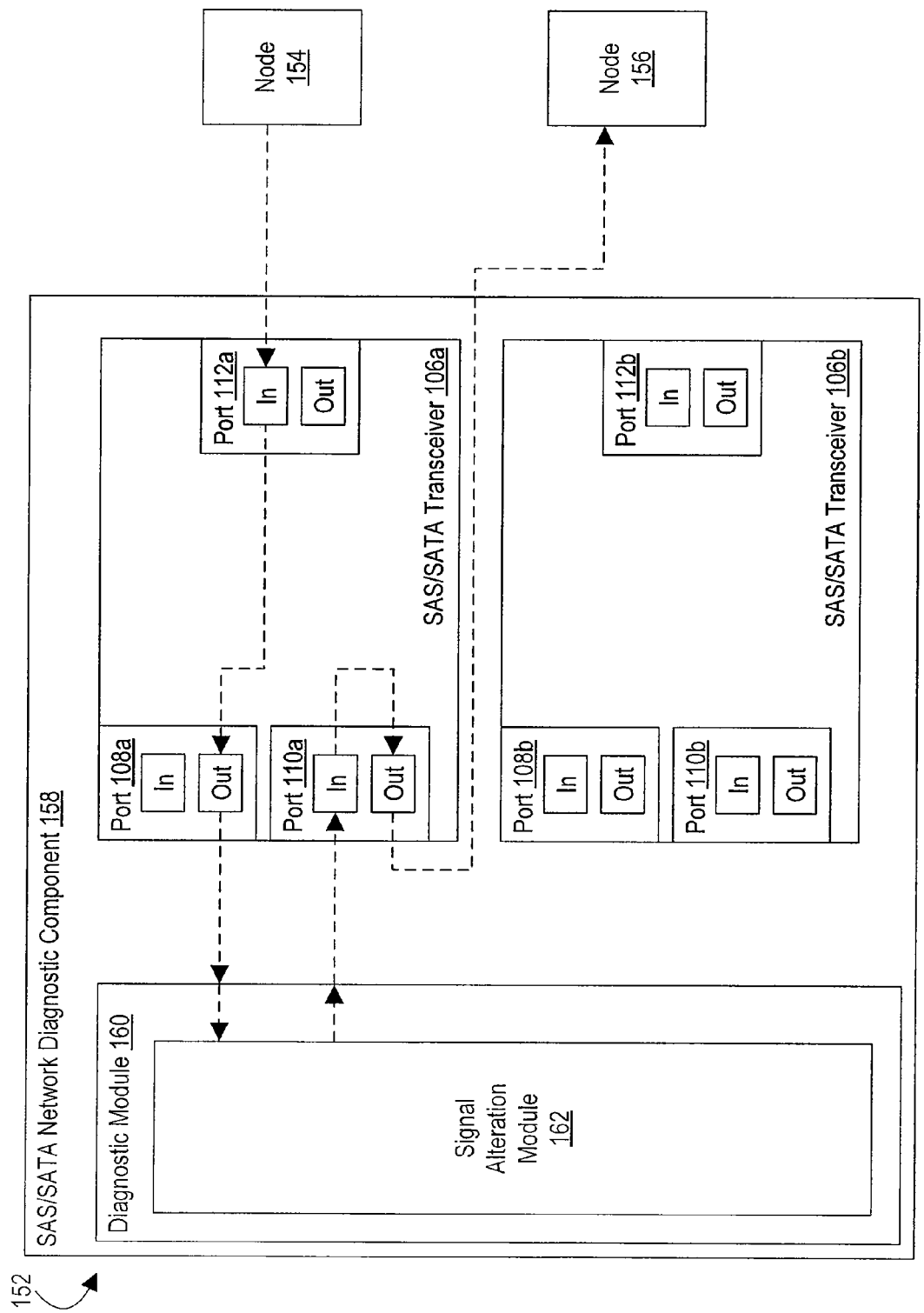
FIG. 12 is a block diagram of the networking system shown in FIG. 9, illustrating yet another exemplary path of a signal used to transmit network messages from between nodes.

FIG. 12 illustrates an exemplary path of the signal used to transmit network messages from the node 154 to the node 156 with the signal alteration module 162 altering the signal. As shown in FIG. 12, the signal may be received via the input of the port 112*a* and transmitted to the output of the port 108*a* via the multiplexer 126*a* (FIG. 9). The diagnostic module 160 may receive the signal from the output of the port 108*a* and may perform a desired network diagnostic function using the network messages sent via the signal. In addition, the signal alteration module 162 may alter the signal. For example, the signal alteration module 162 may digitally retime the signal, may alter the content of the network messages themselves, or both. It will be appreciated, however, that the signal alteration module 162 may alter the signal in other desired ways. The diagnostic module 160 may transmit the altered signal to the input of the port 110*a*. The port 110*a* is preferably in a loop-back mode such that the altered signal is sent from the input of the port 110*a* to the output of the port 110*a* via the multiplexer 128*a* (FIG. 9).

Figure 13:
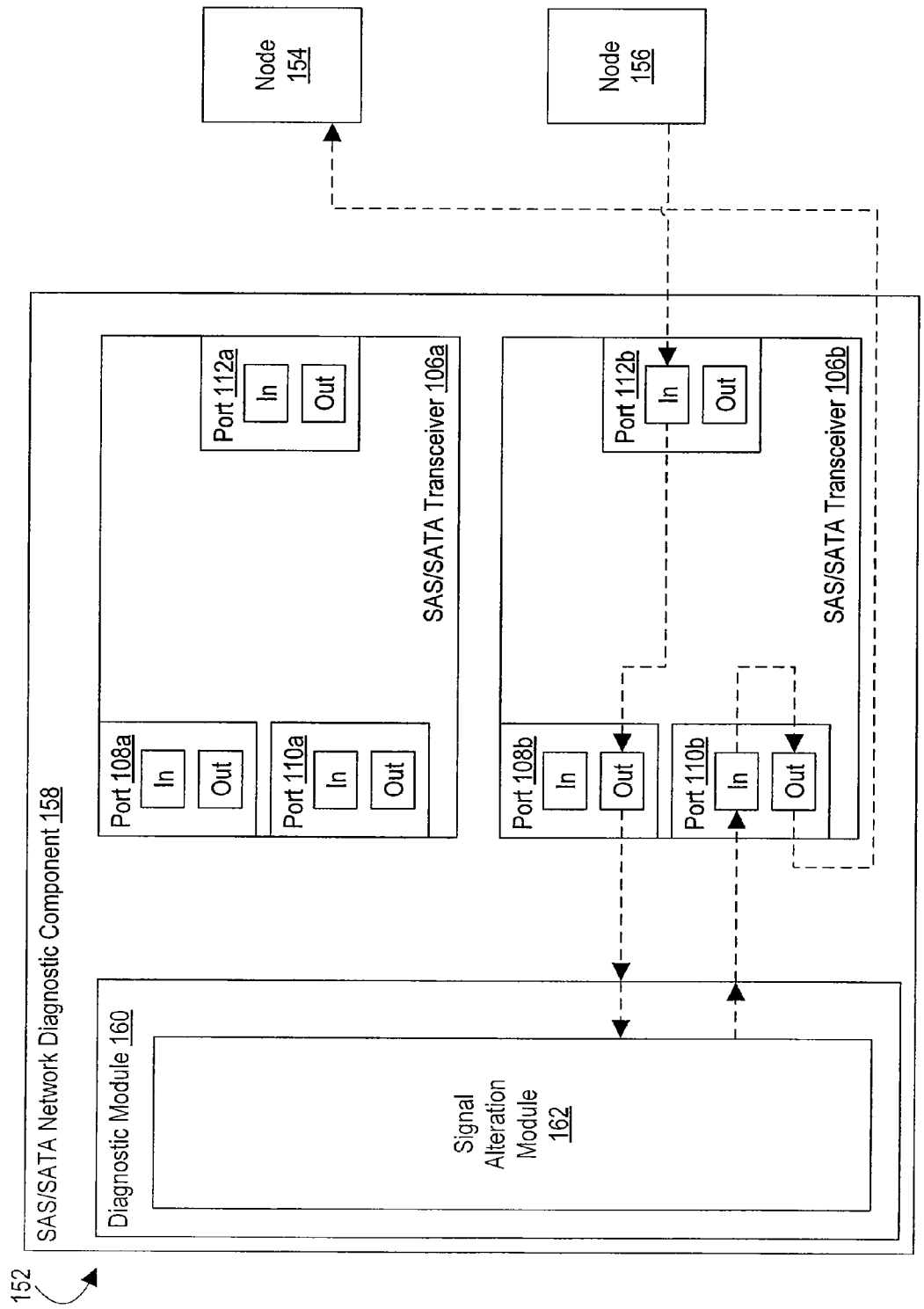
FIG. 13 is a block diagram of the networking system shown in FIG. 9, illustrating still another exemplary path of a signal used to transmit network messages from between nodes.

FIG. 13 illustrates an exemplary path of the signal used to transmit network messages from the node 156 to the node 154 with the signal alteration module 162 altering the signal. As shown in FIG. 13, the signal may be received via the input of the port 112*b* and transmitted to the output of the port 108*b* via the multiplexer 126*b* (FIG. 9). The diagnostic module 160 may receive the signal from the output of the port 108*b* and may perform a desired network diagnostic function using the network messages sent via the signal. In addition, the signal alteration module 162 may alter the signal. For example, the signal alteration module 162 may digitally retime the signal, may alter the content of the network messages themselves, or both. It will be appreciated, however, that the signal alteration module 162 may alter the signal in other desired ways. The diagnostic module 160 may transmit the altered signal to the input of the port 110*b*. The port 110*b* is preferably in a loop-back mode such that the altered signal is sent from the input of the port 110*b* to the output of the port 110*b* via the multiplexer 128*b* (FIG. 9).

Figure 5:
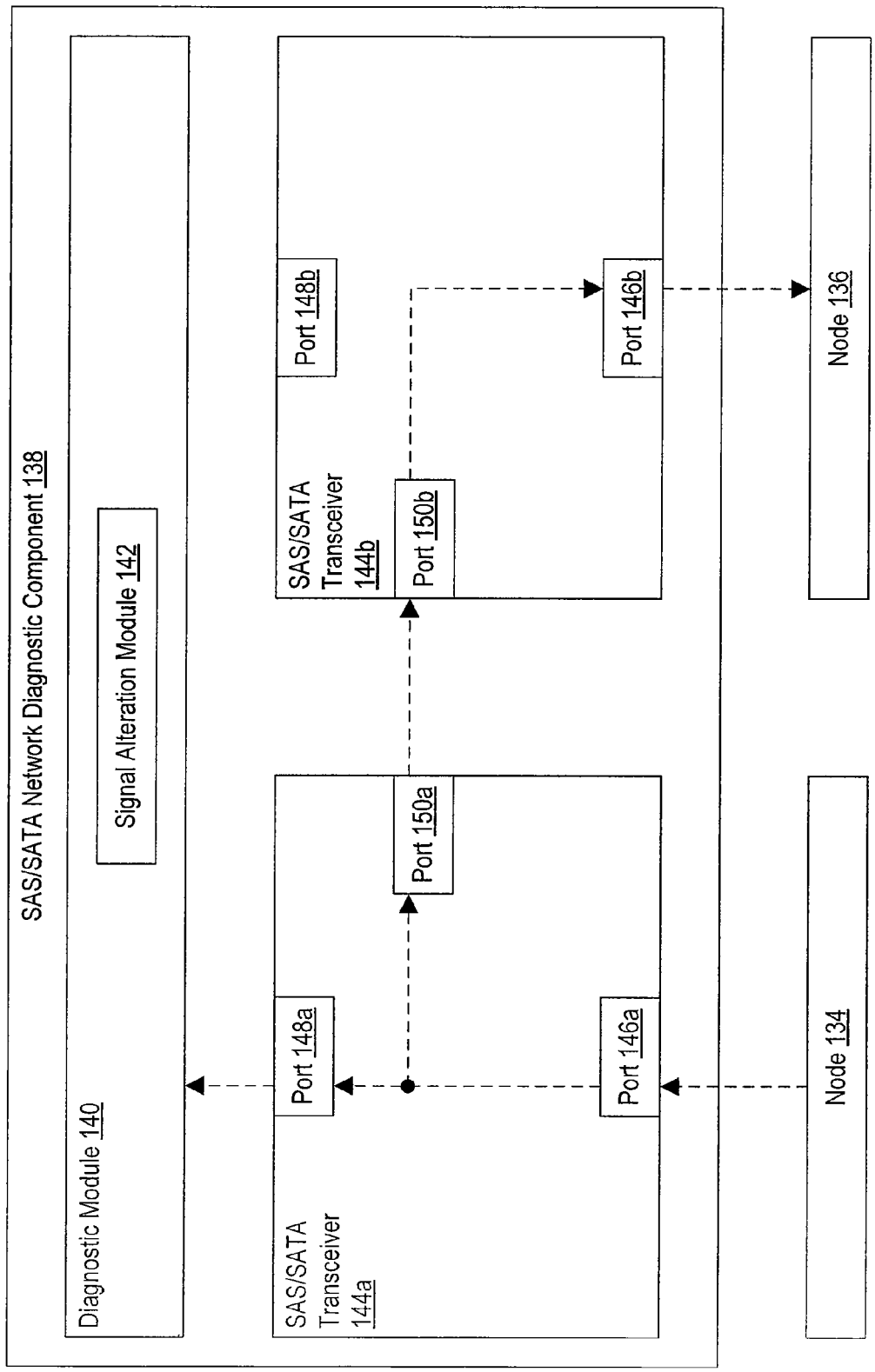
FIG. 5 is a block diagram of the prior art networking system shown in FIG. 3, illustrating a path of a signal used to transmit network messages from between nodes.
Figure 6:
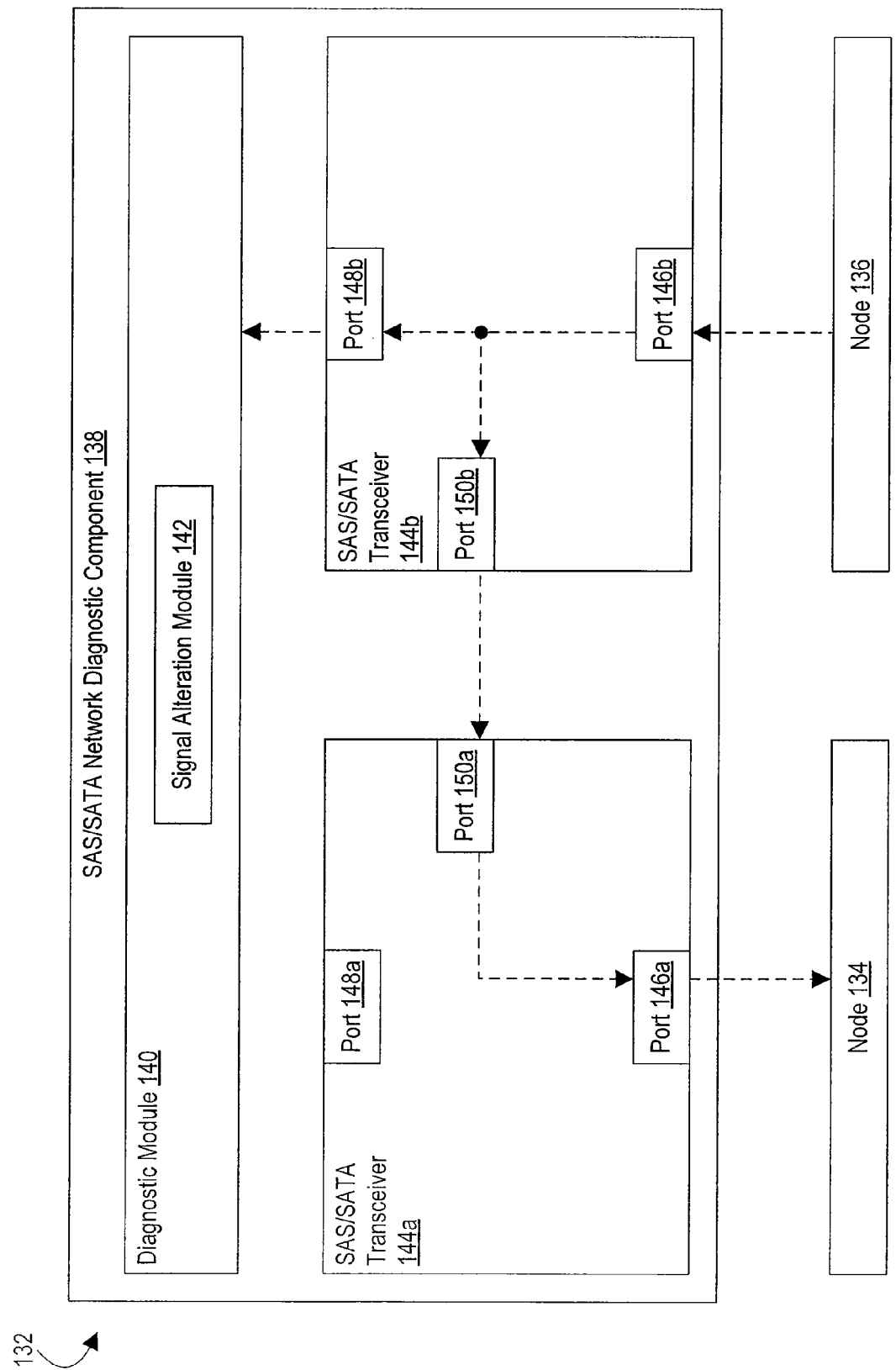
FIG. 6 is a block diagram of the prior art networking system shown in FIG. 3, illustrating another path of a signal used to transmit network messages from between FIG. 7 is a block diagram of the prior art networking system shown in FIG. 3, illustrating yet another path of a signal used to transmit network messages from between nodes.

As shown in FIGS. 10-11, when the signal alteration module 162 does not alter the signal used to transmit the network messages between the nodes 154, 156, the signal preferably passes through a single transceiver once—which may advantageously subject the signal to less jitter and signal degradation. This contrasts with the system 132 (FIGS. 3-8). In particular, as shown in FIGS. 5-6, when the signal alteration module 142 does not alter a signal used to transmit network messages between nodes 102, 104, the signal passes through both of the transceivers 144*a*, 144*b*—which may disadvantageously subject the signal to more jitter and signal degradation.

Figure 7:
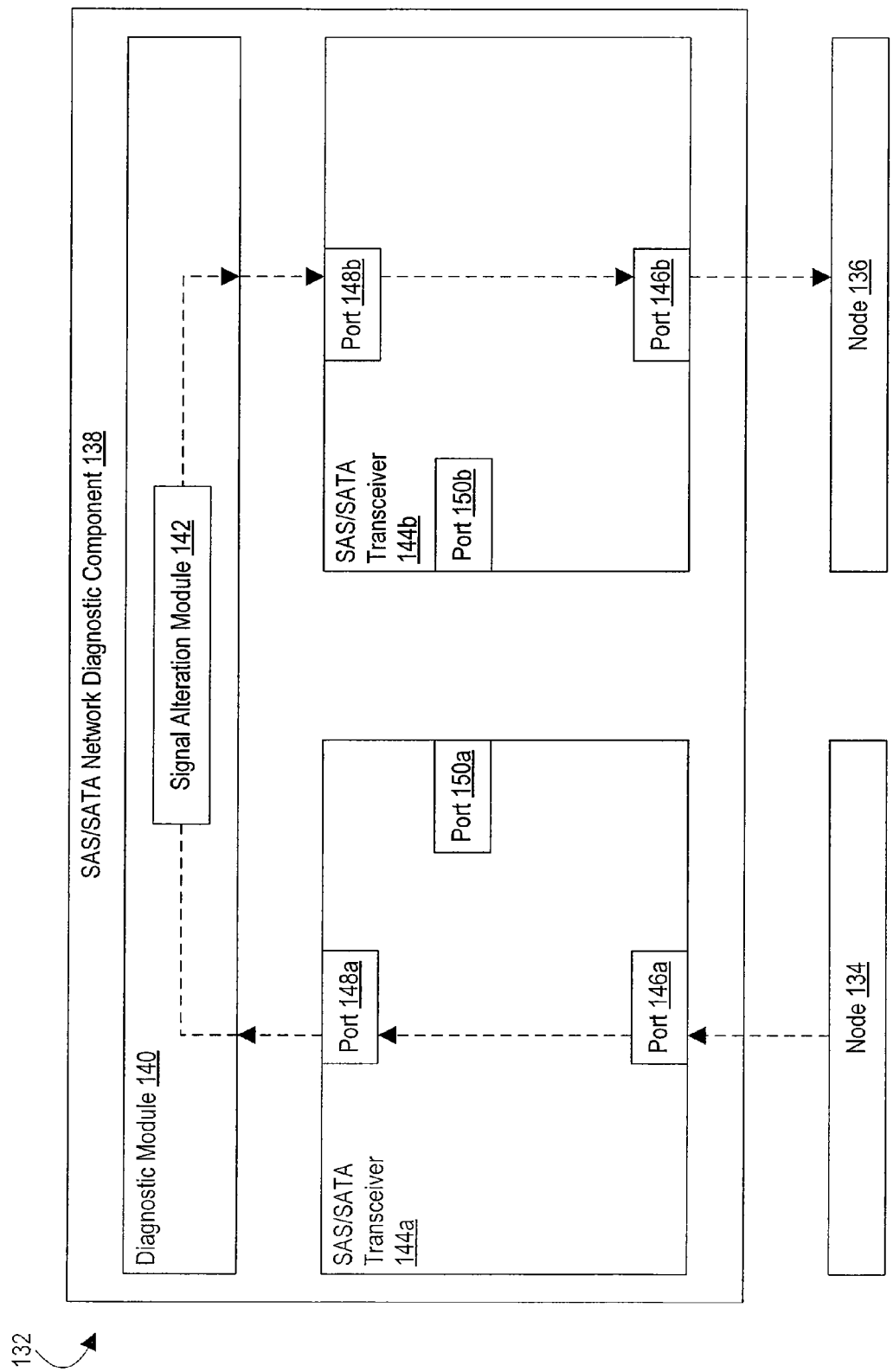
Figure 8:
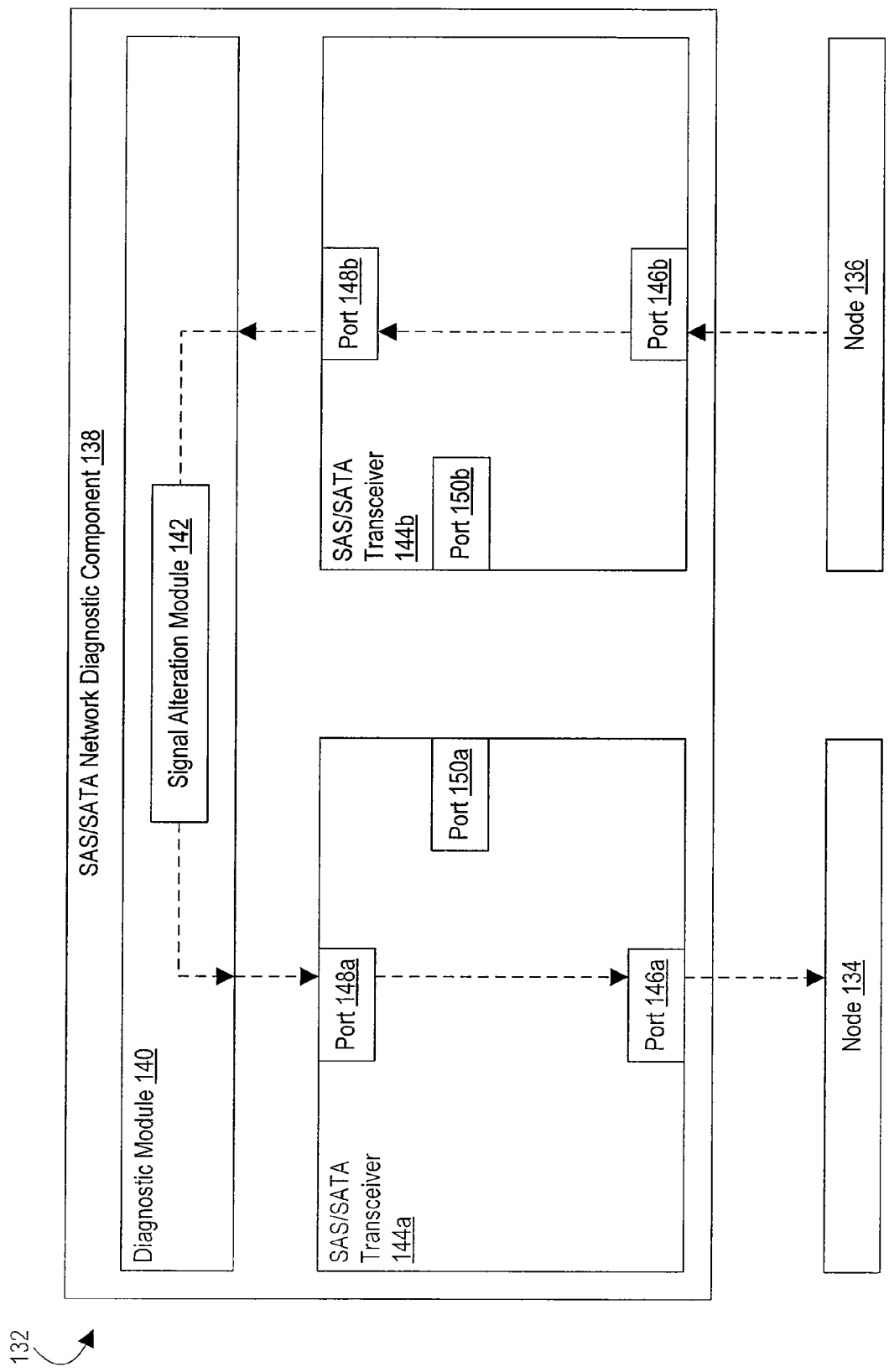
FIG. 8 is a block diagram of the prior art networking system shown in FIG. 3, illustrating still another path of a signal used to transmit network messages from between nodes.

In addition, as shown in FIGS. 12-13, when the signal alteration module 162 alters the signal used to transmit the network messages between the nodes 154, 156, a single transceiver is used, which may provide signal advantages. This contrasts with the system 132 (FIGS. 3-8). In particular, as shown in FIGS. 7-8, when the signal alteration module 142 alters a signal used to transmit network messages between nodes 102, 104, the a signal passes through both of the transceivers 144*a*, 144*b*—which may disadvantageously subject the signal to more jitter and signal degradation.

Figure 14:
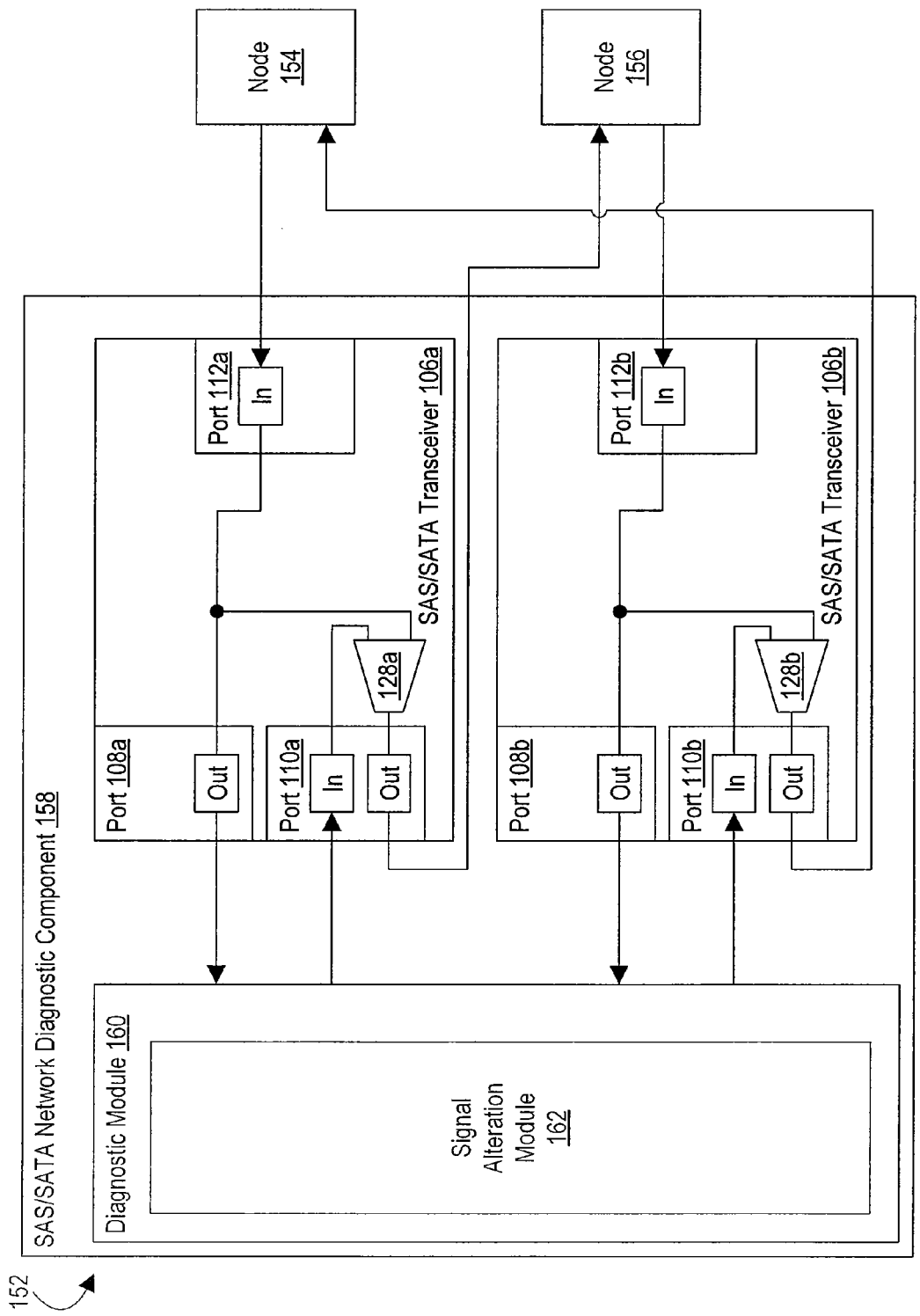
FIG. 14 is a block diagram of a networking system, according to an embodiment of the invention.

It will be appreciated that the network diagnostic component 158 does not require the specific architecture shown in FIGS. 9-13. For example, in an embodiment shown in FIG. 14, the transceivers 106*a*, 106*b* do not require the multiplexers 126*a*, 126*b*, 130*a*, 130*b*; the ports 108*a*, 108*b* do not require inputs; and the ports 112*a*, 112*b* do not require outputs. It will be further appreciated that the network diagnostic component 158 and the transceivers 106*a*, 106*b* may have a variety of suitable architectures, aspects and features other than those shown in FIGS. 9-14.

Exemplary Network Diagnostic Functions

As mentioned above, the network diagnostic component 158 and/or the diagnostic module 160 may perform a variety of network diagnostic functions. The network diagnostic component 158 and/or the diagnostic module 160 may be configured to function as any combination of: a bit error rate tester, a protocol analyzer, a generator, a jammer, a monitor, and any other appropriate network diagnostic device.

Bit Error Rate Tester

In some embodiments, the network diagnostic component 158 and/or the diagnostic module 160 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 158 and/or the diagnostic module 160 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received the bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least network one message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 158 and/or the diagnostic module 160 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 158 and/or the diagnostic module 160 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors. In one embodiment, the signal alteration module 162 (FIGS. 9-14) may be used to selectively alter at least a portion of the network traffic.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 158 and/or the diagnostic module 160 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 158 and/or the diagnostic module 160 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 158 and/or the diagnostic module 160 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety.

Exemplary Systems

It will be appreciated that the network diagnostic component 158 and/or the diagnostic module 160 may be used to implement a variety of systems.

In one embodiment, the network diagnostic component 158 may comprise a printed circuit board. The printed circuit board may include a CPU module, the diagnostic module 160, the transceivers 106a, 106b; or any combination thereof. The diagnostic module 160 may be coupled to the CPU module.

In one embodiment, the network diagnostic component 158 may comprise a blade. The blade may include a printed circuit board, an interface, the diagnostic module 160, the transceivers 106a, 106b; or any combination thereof.

In one embodiment, the network diagnostic component 158 may comprise a chassis computing system. The chassis computing system may include one or more CPU modules, which may be adapted to interface with one, two, or more blades or other printed circuit boards. For example, a blade may have an interface though which a diagnostic module 160 may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 158 may comprise an appliance. Depending on the particular configuration, the appliance may include any suitable combination of one or more CPU modules and one or more diagnostic modules 160. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 158 may comprise any of a variety of other suitable network diagnostic components.

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network diagnostic component comprising:
   a network diagnostic module configured to perform at least one network diagnostic function; and
   a first transceiver configurable between a first state and a second state, the first transceiver comprising:
      a first port including an input;
      a second port including an output; and
      a third port including an input and an output;
   when the first transceiver is in the first state: the input of the first port is configured for receiving a first signal from a first node, the first signal forming one or more network messages; the output of the second port is configured for sending the first signal to the network diagnostic module; the input of the third port is configured for receiving a second signal from the network diagnostic module, the second signal forming one or more network messages; and the output of the third port is configured for sending the second signal to a second node without the need for the second signal to pass through another port of the first transceiver or a port of a second transceiver before reaching second node; and
   when the first transceiver is in the second state: the input of the first port is configured for receiving a third signal from the first node, the third signal forming one or more network messages; the output of the second port is configured for sending the third signal to the network diagnostic module; and the output of the third port is configured for sending the third signal to the second node without the need for the third signal to pass through another port of the first transceiver or a port of a second transceiver before reaching the second node.

2. The network diagnostic component as in claim 1, wherein the network diagnostic module is configured to create the second signal from the first signal.

3. The network diagnostic component as in claim 2, wherein the network diagnostic module is configured to create the second signal from the first signal by digitally retiming the first signal into the second signal.

4. The network diagnostic component as in claim 2, wherein the network diagnostic module is configured to create the second signal from the first signal by altering the contents of at least one of the one or more network messages formed by the first signal.

5. The network diagnostic component of claim 1, wherein the at least one network diagnostic function includes a jammer network diagnostic function comprising:
   receiving a bit sequence comprising at least one network message;
   altering at least a portion of the bit sequence; and
   transmitting at least a portion of the altered bit sequence.

6. The network diagnostic component of claim 1, wherein the at least one network diagnostic function includes a protocol-analyzer network diagnostic function comprising:
   receiving a first bit sequence comprising at least one network message;
   comparing at least a portion of the first bit sequence with a second bit sequence; and
   in response to the comparison, executing a capture of a third bit sequence comprising at least a portion of a network message.

7. The network diagnostic component of claim 1, wherein the at least one network diagnostic function includes a monitor network diagnostic function comprising:
   receiving a first bit sequence comprising at least one network message;
   comparing at least a portion of the first bit sequence with a second bit sequence; and
   in response to the comparison, generating one or more statistics.

8. The network diagnostic component as in claim 1, wherein the first transceiver is a SAS/SATA transceiver.

9. The network diagnostic component as in claim 1, further comprising:
   a second transceiver configurable between a first state and a second state, the second transceiver comprising:

a fourth port including an input;
a fifth port including an output; and
a sixth port including an input and an output;
when the second transceiver is in the first state: the input of the fourth port is configured for receiving a fourth signal from the second node, the fourth signal forming one or more network messages; the output of the fifth port is configured for sending the fourth signal to the network diagnostic module; the input of the sixth port is configured for receiving a fifth signal from the network diagnostic module, the fifth signal forming one or more network messages; and the output of the sixth port is configured for sending the fifth signal to the first node; and
when the second transceiver is in the second state: the input of the fourth port is configured for receiving a sixth signal from the second node, the sixth signal forming one or more network messages; the output of the fifth port is configured for sending the sixth signal to the network diagnostic module; and the output of the sixth port is configured for sending the sixth signal to the first node.

10. A network diagnostic component comprising:
a signal alteration module; and
a first transceiver configurable between a first state and a second state, the first transceiver comprising:
a first port including an input;
a second port including an output; and
a third port including an input and an output;
when the first transceiver is in the first state: the input of the first port is configured for receiving a first signal from a first node, the first signal forming one or more network messages; the output of the second port is configured for sending the first signal to the signal alteration module; the input of the third port is configured for receiving a second signal from the signal alteration module, the second signal forming one or more network messages; and the output of the third port is configured for sending the second signal to a second node without the need for the second signal to pass through another port of the first transceiver or a port of a second transceiver before reaching the second node; and
when the first transceiver is in the second state: the input of the first port is configured for receiving a third signal from the first node, the third signal forming one or more network messages; the output of the second port is configured for sending the third signal to the network diagnostic module; and the output of the third port is configured for sending the third signal to the second node without the need for the third signal to pass through another port of the first transceiver or a port of a second transceiver before reaching the second node.

11. The network diagnostic component as in claim 10, wherein the signal alteration module is configured to create the second signal from the first signal by digitally retiming the first signal into the second signal.

12. The network diagnostic component as in claim 10, wherein the signal alteration module is configured to create the second signal from the first signal by altering the contents of at least one of the one or more network messages formed by the first signal.

13. The network diagnostic component as in claim 10, wherein the first transceiver is a SAS/SATA transceiver.

14. The network diagnostic component as in claim 10, further comprising:
a second transceiver configurable between a first state and a second state, the second transceiver comprising:

a fourth port including an input;
a fifth port including an output; and
a sixth port including an input and an output;
when the second transceiver is in the first state: the input of the fourth port is configured for receiving a fourth signal from a second node, the fourth signal forming one or more network messages; the output of the fifth port is configured for sending the fourth signal to the signal alteration module; the input of the sixth port is configured for receiving a fifth signal from the signal alteration module, the fifth signal forming one or more network messages; and the output of the sixth port is configured for sending the fifth signal to a first node; and
when the second transceiver is in the second state: the input of the fourth port is configured for receiving a sixth signal from the second node, the sixth signal forming one or more network messages; the output of the fifth port is configured for sending the sixth signal to the network diagnostic module; and the output of the sixth port is configured for sending the sixth signal to the first node.

15. A network diagnostic component comprising:
a network diagnostic module configured to perform at least one network diagnostic function; and
a first transceiver configurable between a first state and a second state, the first transceiver comprising:
a first port including an input;
a second port including an output; and
a third port including an input and an output;
when the first transceiver is in the first state: the input of the first port is configured for receiving a first set of one or more network messages from a first node; the output of the second port is configured for sending the first set of one or more network messages to the network diagnostic module; the input of the third port is configured for receiving a second set of one or more network messages from the network diagnostic module, the second set of one or more network messages being derived from the first set of one or more network messages; and the output of the third port is configured for sending the second set of one or more network messages to a second node without the need for the second signal to pass through another port of the first transceiver or a port of a second transceiver before reaching the second node; and
when the first transceiver is in the second state: the input of the first port is configured for receiving a third set of one or more network messages from the first node; the output of the second port is configured for sending the third set of one or more network messages to the network diagnostic module; and the output of the third port is configured for sending the third set of one or more network messages to the second node without the need for the third signal to pass through another port of the first transceiver or a port of a second transceiver before reaching the second node.

16. The network diagnostic component of claim 15, wherein the at least one network diagnostic function includes a jammer network diagnostic function comprising:
receiving a bit sequence comprising at least one network message;
altering at least a portion of the bit sequence; and
transmitting at least a portion of the altered bit sequence.

17. The network diagnostic component of claim 15, wherein the at least one network diagnostic function includes a protocol-analyzer network diagnostic function comprising:
receiving a first bit sequence comprising at least one network message;

comparing at least a portion of the first bit sequence with a second bit sequence; and in response to the comparison, executing a capture of a third bit sequence comprising at least a portion of a network message.

18. The network diagnostic component of claim 15, wherein the at least one network diagnostic function includes a monitor network diagnostic function comprising:

receiving a first bit sequence comprising at least one network message;

comparing at least a portion of the first bit sequence with a second bit sequence; and in response to the comparison, generating one or more statistics.

19. The network diagnostic component as in claim 15, wherein the first transceiver is a SAS/SATA transceiver.

20. The network diagnostic component as in claim 15, further comprising:

a second transceiver configurable between a first state and a second state, the second transceiver comprising:

a fourth port including an input;

a fifth port including an output; and a sixth port including an input and an output;

when the second transceiver is in the first state: the input of the fourth port is configured for receiving a fourth set of one or more network messages from the second node; the output of the fifth port is configured for sending the fourth set of one or more network messages to the network diagnostic module; the input of the sixth port is configured for receiving a fifth set of one or more network messages from the network diagnostic module, the fifth set of one or more network messages being derived from the fourth set of one or more network messages; and the output of the sixth port is configured for sending the fifth set of one or more network messages to the first node; and when the second transceiver is in the second state: the input of the fourth port is configured for receiving a sixth set of set of one or more network messages from the second node; the output of the fifth port is configured for sending the sixth set of one or more network messages to the network diagnostic module; and the output of the sixth port is configured for sending the sixth set of one or more network messages to the first node.

* * * * *